Jan. 25, 1966 A. V. ARMSTRONG 3,231,243
APPARATUS FOR BLENDING BULK RAW MATERIALS WITH COLORANT
Filed May 11, 1964 4 Sheets-Sheet 1

INVENTOR
ARTHUR V. ARMSTRONG

BY *Wenderoth, Lind and Ponack*
ATTORNEYS

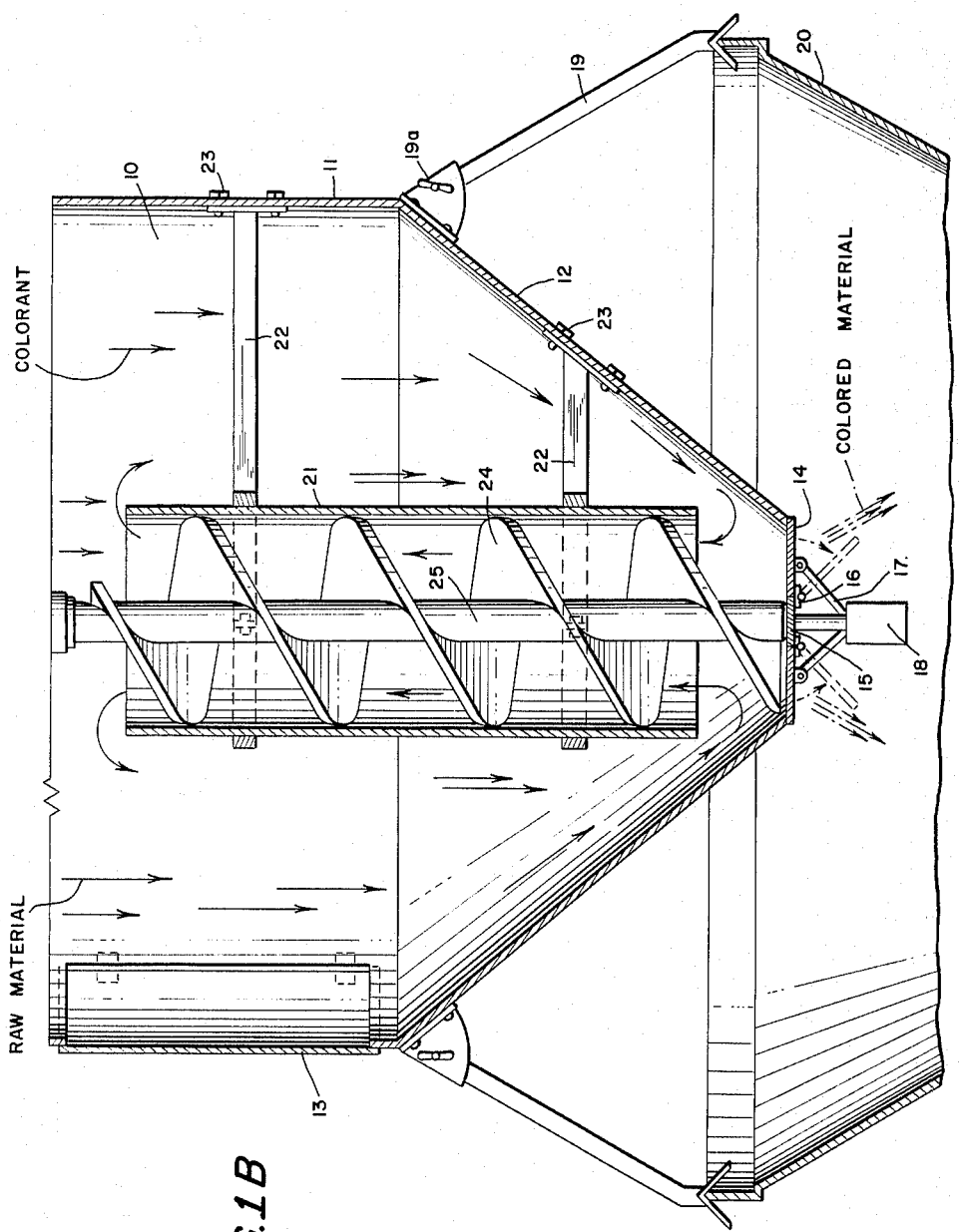

Jan. 25, 1966  A. V. ARMSTRONG  3,231,243
APPARATUS FOR BLENDING BULK RAW MATERIALS WITH COLORANT
Filed May 11, 1964  4 Sheets-Sheet 3

INVENTOR
ARTHUR V. ARMSTRONG

BY *Wenderoth, Lind & Ponack*

ATTORNEYS

INVENTOR
ARTHUR V. ARMSTRONG

BY Wenderoth, Lind and Ponack

ATTORNEYS

United States Patent Office 3,231,243
Patented Jan. 25, 1966

3,231,243
APPARATUS FOR BLENDING BULK RAW
MATERIALS WITH COLORANT
Arthur V. Armstrong, Whitehouse, N.J., assignor to
Plastic Molders Supply Co., Inc., Fanwood, N.J.
Filed May 11, 1964, Ser. No. 366,446
5 Claims. (Cl. 259—8)

The present invention relates to an apparatus for blending bulk raw materials, particularly clear plastic in pellet or powdered form, with a colorant in powdered form.

Heretofore difficulty has been experienced in obtaining an even blend of a precise amount of colorant with bulk raw material, the amount of colorant which is blended with a batch of raw material and the thoroughness of the blending depending primarily on the operator and his skill and timing.

It is an object of the present invention to provide an apparatus which blends a precise amount of colorant into a measured batch of raw material and then thoroughly mixes and blends the raw material and the colorant.

It is a further object of the present invention to provide an apparatus which adds a colorant to a raw material and then thoroughly mixes and blends them and in which the amount of raw material and the amount of colorant mixed can be automatically and precisely controlled.

Other and further objects of the present invention will become apparent from the following specification and claims, taken together with the accompanying drawings, in which:

FIG. 1B is a sectional elevation view of a lower part of the blending apparatus of FIG. 1A;

Figure 1A:
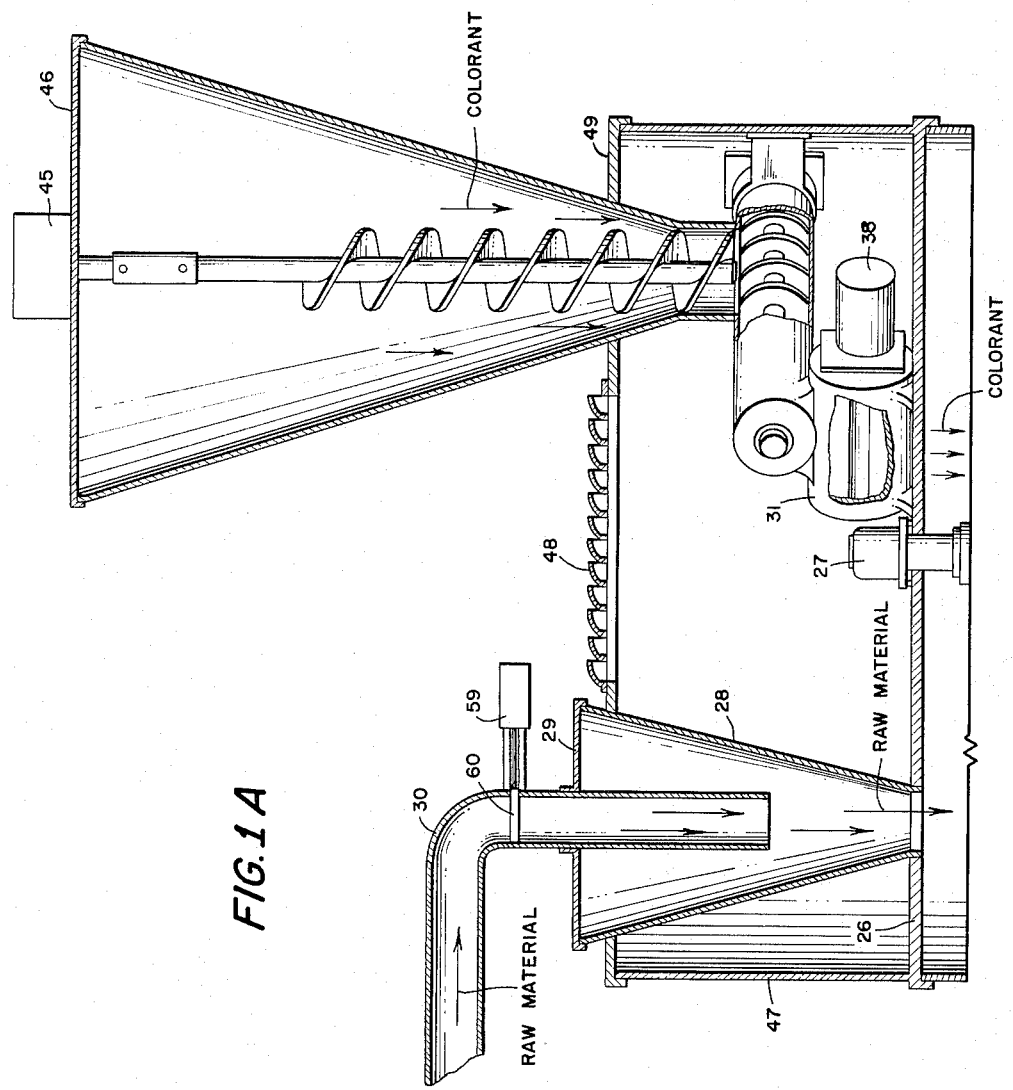
FIG. 1A is a sectional elevation view of the upper part of a blending apparatus according to the present invention.

The apparatus as seen in FIGS. 1A and 1B comprises a blending chamber 10 which has a cylindrical section 11 and a truncated conical section 12 on the bottom of the cylindrical section. A cleanout door 13 is provided in the cylindrical section, and trap doors 14 are hinged to the bottom 15 of the truncated section 12 on hinges 16. Door control means are provided which comprise links 17 each having one end pivoted to one of the trap doors 15 and having the other end pivoted to the arm of a solenoid 18 susupended from the bottom 15.

Mounting struts 19 are pivotaly mounted at spaced intervals around the periphery of the bottom of the cylindrical section 11 of the chamber 10 where it joins the top of the truncated conical section 12, and the mounting struts extend downwardly and outwardly of the chamber 10 and are adapted to be positioned on the rim of a molding machine hopper 20 to support the apparatus of the present invention above the hopper 20. Means, such as a wing nut and bolt 19a, can be provided to secure the mounting struts in any one of a plurality of positions.

Within the blending chamber 10 is a central blending tube 21 which is mounted in position within the chamber 10 with the lower end spaced from the bottom of the chamber by a plurality of tube supports 22 extending radially inwardly from the walls of the chamber 10 and secured thereto by bolts 23. A cleanout door (not visible in the figures) can also be provided in the tube 21. Within the tube 21 is a homogenizing screw conveyor 24 mounted on a screw conveyor shaft 25. At the lower end the conveyor extends out of the tube 21 and the shaft 25 is rotatably mounted on the bottom 15, and at the upper end it is coupled to a screw conveyor drive means in the form of an electric motor 27 mounted on a cover 26 for the top of the chamber 10. The outside diameter of the screw conveyor 24 is substantially equal to the inside diameter of tube 21.

On the cover 26 on one side of the electric motor 27 is a raw material hopper 28, the bottom end of which extends through the cover 26 into the interior of the chamber 10. The raw material hopper 28 has a cover 29 thereon, and a raw material feed conveyor in the form of a pipe 30 extends through the cover 29 into the interior of the hopper 28. A valve 60 controlled by a solenoid 59 can be positioned in pipe 30.

Figure 2:
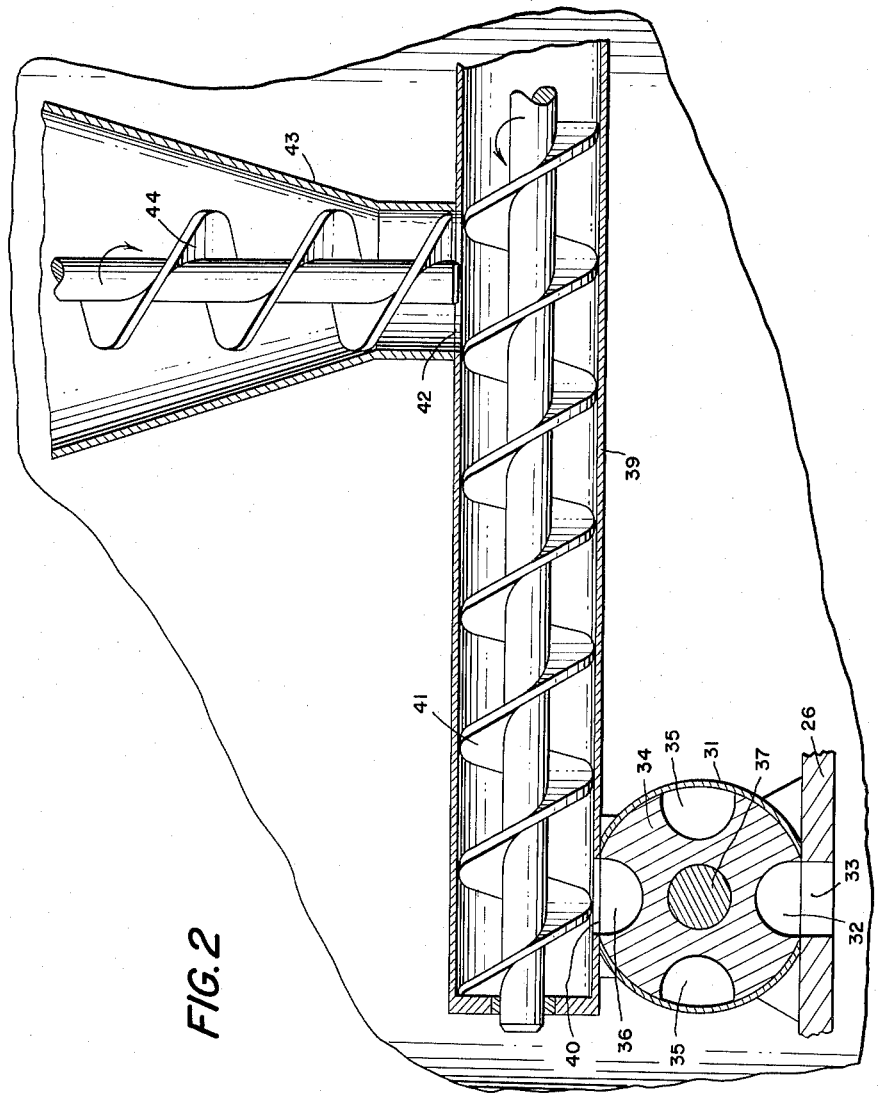
FIG. 2 is a sectional view, on an enlarged scale, of the colorant feed means of the apparatus of FIG. 1A.

On the cover 26 on the other side of the motor 27 is a colorant feed drum housing 31 which has a colorant discharge opening 32 therein at the bottom of the housing, and which discharge opening is aligned with a colorant feed opening 33 in the cover 26. These openings are the same size and are shown more clearly in FIG. 2. Substantially diametrically opposite the discharge opening 32 feed drum housing 31 has an intake opening 36. Rotatably mounted within the housing 31 and fitted closely to the internal surface of the wall thereof is a feed drum 34 having a plurality of pockets 35 therein spaced around the pheripheral surface of the drum. The drum is mounted on a shaft 37 to which is connected a driving means in the form of an electric motor 38 mounted on the end of the housing 31.

Above the feed drum housing 31 is a colorant feed tube 39 having one end connected to the feed drum housing 31. The feed tube 39 has a discharge opening 40 in the end connected to the feed drum housing 31, which discharge opening is the same size as and aligned with the intake opening 36 of the feed drum housing. Adjacent the other end of the feed tube 39 is an intake opening 42, and rotatably mounted within the tube 39 is a colorant metering screw 41 driven by driving means such as an electric motor (not shown) coupled thereto at the end opposite the end connected to the feed drum housing.

On the other end of the colorant feed tube 39 is a colorant feed hopper 43, the lower end of which opens into the colorant feed tube through the intake opening 42. Positioned within the colorant feed hopper 43 is a feed screw 44 driven by a driving means in the form of an electric motor 45 mounted on a cover 46 covering the colorant feed hopper 43.

Mounted on top of the chamber cover 26 and surrounding the feeding means is a feed means housing 47 which has a cover 49 with vents 48 therein.

Figure 3:
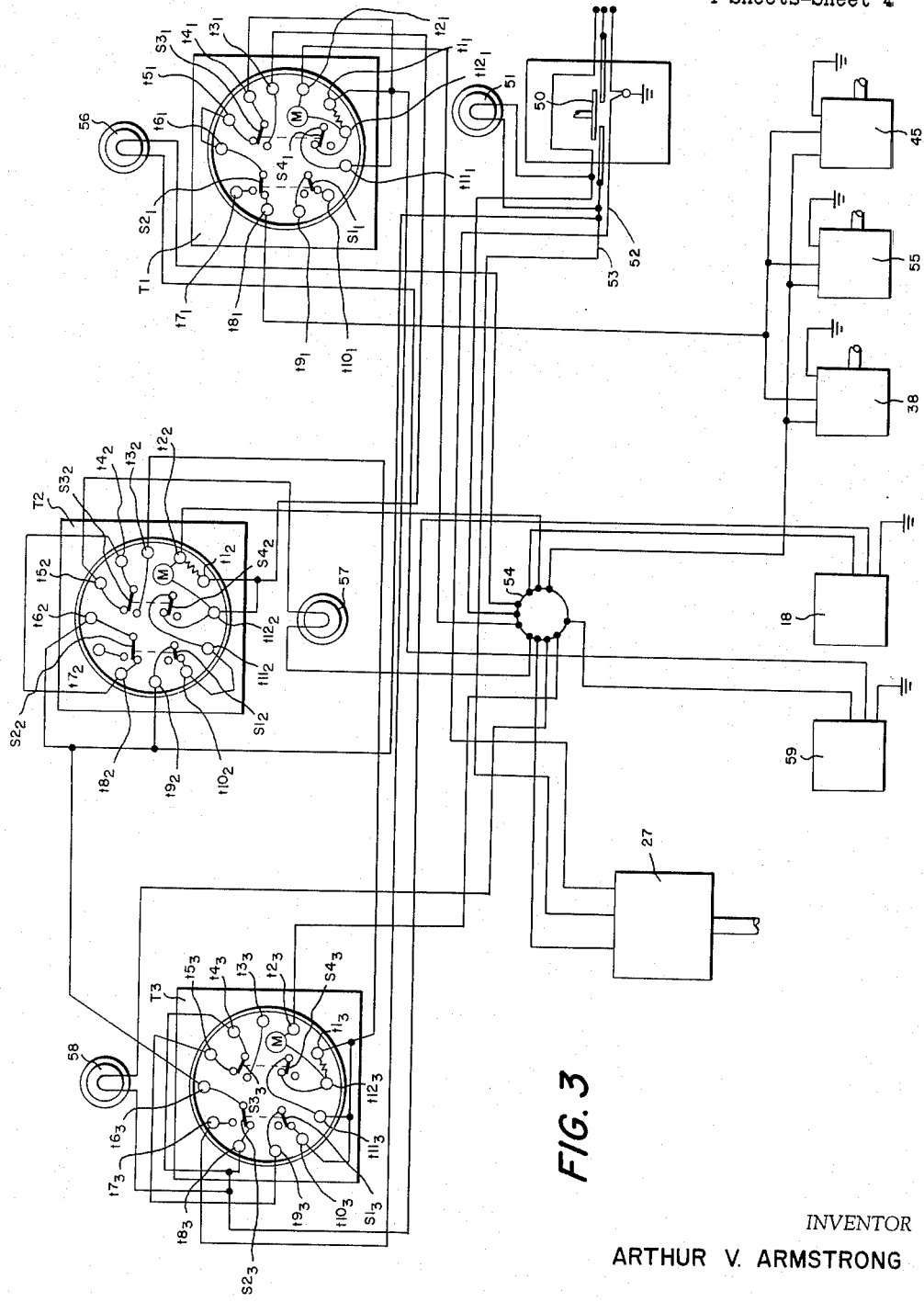
FIG. 3 is a circuit diagram of the timer circuit for the appartus of FIGS. 1A, 1B and 2.

In order to operate the blending apparatus so as to blend materials properly and with the proper controls, there is provided a timing means including a plurality of timers connected so as to control the time during which the colorant feed drum, the colorant metering screw and the colorant feed screw operate, and the time during which the homogenizing screw conveyor operates, and to operate the discharge solenoid at the end of the feeding and blending operations. The timing means is schematically shown in FIG. 3, and comprises three timers $T_1$, $T_2$ and $T_3$, each being the type having a plurality of terminals $t1$–$t12$ and each having two pairs of switches, the pair $s1$ and $s2$ operating in tandem when the timer has finished its timed run. The pair of switches $s3$ and $s4$ in timers $T_1$ and $T_2$ operate in tandem, and when the timer has finished its run they will remain in the down position in the drawings until the timer is reset. Switches $s3$ and $s4$ of timer $T_3$, however, remain down only during the timed run of timer $T_3$ and will move to the up position at the end of the timed run. Each timer has a timer motor M which is started by a coil between the terminals $t1$ and $t2$ of the timer, and which coil also causes the timers $T_1$ and $T_2$ to reset for the start of a new cycle. The timers also have means for presetting the timer for which the timer motor M will run, so that when the timer is set, it will always run for the set time. The three timers can conveniently be mounted on the feed means housing 47 for easy access by the operator of the apparatus.

The timer means circuit has an on-off switch 50 in parallel with which is an on-off indicator lamp 51. A ground wire 52 extends through the on-off switch 50 to the electric motor 27 which drives the screw conveyor 24 within the blending chamber. One side 53 of the power supply likewise extends from the on-off switch 50 to the motor 27. The said one side of the power supply is likewise connected to the terminals $t6_2$ and $t9_2$ of timer $T_2$ and to terminal $t6_3$ of timer $T_3$. The other side of the power supply is connected to a terminal block 54 which in turn is connected to various parts of the circuit as will be described hereinafter.

In each of the timers, the timer motor M is connected across the terminals $t2$ and $t12$, while the starting coil is connected across the terminals $t1$ and $t2$. The terminals $t12$ and $t11$ are connected through the switch $s4$ when the switch is in the upper position.

In timer $T_1$ the terminals $t1_1$, $t4_1$ and $t11_1$ are all connected by a common lead to the terminal $t7_3$ in timer $T_3$. Terminal $t2_1$ is connected to the terminal block 54, and the terminal $t3_1$ is connected to the terminals $t1_2$ and $t12_2$ of timer $T_2$. Terminals $t5_1$ and $t6_1$ are connected to each other, and the switch $s3_1$ connects the terminals $t4_1$ and $t5_1$ in the upper position and the terminals $t4_1$ and $t3_1$ in the lower position. The terminal $t8_1$ is connected to the three motors 38 and 45 and to the motor 55 for the metering screw, which is not shown in FIGS. 1A, and 1B and 2. The motors are also connected to the terminal block 54. A lamp 56 is connected in parallel across the motor circuit and the terminal block 54, and will indicate when the motors are operating.

In the timer $T_2$, the terminal $t2_2$ is connected to the terminal block 54, and the terminal $t3_2$ is connected to the terminals $t1_3$, $t10_3$, and $t11_3$. Terminal $t4_2$ is connected to $t8_2$, and the switch $s3_2$ connects the terminals $t5_2$ and $t4_2$ in the upper position and the terminals $t4_2$ and $t3_2$ in the lower position. The terminal $t5_2$ is connected through an indicator lamp 57 to the terminal block 54, so that the lamp 57 will indicate when the apparatus is on the blending cycle. The terminals $t10_2$ and $t11_2$ are connected to each other.

In the timer $T_3$ the terminal $t2_2$ is connected to the terminal block 54, while the terminal $t4_3$ is connected to terminal $t8_3$, and this terminal is in turn connected to discharge solenoid 18. The solenoid 18 is also connected to the terminal block 54 and to ground. The terminal $t5_3$ is connected to terminal $t9_3$, and the terminal $t9_3$ is connected to one side of switch $s1_3$ so as to be connected to the terminal $t10_3$ when switch $s1_3$ is in the down position. A lamp 58 is connected across the terminal $t8_3$ and the terminal block 54 to indicate when the timer $T_3$ is in operation and hence when the apparatus is discharging.

In operation, with the trap doors 14 shut, a charge of raw materials is fed into the raw material hopper 28 from which it empties into the blending chamber 10. At the same time, the colorant feed screw 44 in the colorant feed hopper 43, which has powdered colorant therein, is driven along with the metering screw 41 and the drum 34, to feed colorant powder from the hopper 43 through the feed tube 39. Rotation of the drum 34 transfers powdered colorant from the intake opening in the drum housing 31 to the discharge opening 32, and the colorant falls through the opening 32 and the feed opening 33 in the cover 26. Since the pockets 35 each hold only a certain amount of powdered colorant, the amount of colorant delivered into the blending chamber can be precisely measured in multiples of the amount held by each pocket. By stopping the drum 34 after a predetermined number of revolutions, the amount of colorant delivered can be precisely controlled.

During the time the raw material and the colorant are being delivered into the blending chamber, the drive means for the homogenizing screw conveyor 24 rotates the screw conveyor within the central blending tube and this rotation continues after the desired amount of colorant is fed. The raw material and the colorant are lifted and blended as they are conveyed upwardly along the tube 21, and as they come out of the top of the tube they fall to the bottom of the chamber 10 and are again picked up and conveyed upwardly by the screw conveyor 24. By continuing the circulation of the raw material and the colorant within the chamber 10, the colorant is thoroughly mixed with the raw material. In the case of mixing plastic pellets and powdered colorant, the powdered colorant will evenly and thoroughly coat the plastic pellets. When powdered plastic is mixed with powdered colorant, the powders are thoroughly and evenly intermixed.

When the blending of the raw material and the colorant are complete, the solenoid 18 is energized, thereby opening the trap doors 14. The blended raw material and colorant flow out through the trap doors into the molding machine hopper 20 while the conveyor 24 continues to run.

The timer means controls the operation of the apparatus to carry out the operation as described above. The on-off switch 50 is turned to the on position, thereby completing a circuit through the conveyor screw motor 27, and this circuit will be complete until the apparatus is turned off by moving the switch 50 to the off position. Prior to the running of the apparatus the switches in the timers will be in the opposite positions from those shown in FIG. 3. When switch 50 is closed, a circuit is completed through the starting coil for the timer $T_1$, this circuit extending from the terminal block 54, through the coil, and then through terminal $t7_3$ of timer $T_3$, switch $s2_3$, which is in the upper position, and through terminal $t6_3$ back to the one side of the power supply. The timer $T_1$ will then be started, and the switches will be moved into the positions shown in the figure. The switch $s4_1$ will be closed, completing a circuit through the timer motor, and the switch $s2_1$ will be closed completing a circuit through the terminals $t4_1$, $s3_1$, $t5_1$, and $t6_1$ to the three motors 38, 45 and 55, thereby energizing these motors and driving the feed screw 44, the metering screw 41, and the feed drum 34. When the timer has run out, the switches $s3_1$ and $s4_1$ will change position to the positions opposite to those shown in the drawing, and the circuit through the timer motor will be broken and the circuit to the motors 38, 45 and 55 will be broken. The switch $s3_1$ will connect the terminal $t4_1$ to the terminal $t3_1$, thereby connecting the said one side of the power supply to the terminals $t1_2$ and $t12_2$ of timer $T_2$. This will energize the starting coil for the timer $T_2$ and the timer will be started with the switches in the positions shown in the drawing. A circuit will be completed through the timer motor, and circuit will be completed from the one side of the power supply through the terminal $t6_2$, switch $s2_2$, terminal $t8_2$, terminal $t4_2$ switch $s3_2$, terminal $t5_2$ and the lamp 57 to the terminal block 54. The "blend" indicator lamp 57 will therefore stay on until the timer $T_2$ runs out, at which time the switches $s3_2$ and $s4_2$ will be switched over to the positions opposite those shown. A circuit will then be completed from the one side of the power supply through the terminal $t6_2$ $s2_2$, terminal $t8_2$ terminal $t4_2$, switch $s3_2$, terminal $t3_2$, and terminals $t1_2$ and $t2_3$ and the starting coil for the timer $T_3$ to the terminal block 54.

Time $T_3$ will thus be started, thereby moving the switches to the positions shown. This break the contact between contact $t7_3$ and $t6_3$, thus breaking the circuit to the one side of the power supply which extends through motor starting circuits of the timers $T_1$ and $T_2$, and readying the starting coils for resetting the timers $T_1$ and $T_2$. At the same time a circuit is completed from the one side of the power supply through terminal $t6_3$, switch $s2_3$, terminal $t8_3$ and solenoid 18, thereby energizing solenoid 18 to open the doors in the bottom of the chamber 10. A holding circuit for the timer motor for the timer $T_3$ is also completed through the switch $s1_3$, terminal $t9_3$, terminal $t4_3$, switch $s3_3$, terminal $t5_3$ and the terminal $t8_3$. When the timer $T_3$ has run out, the switches will change position, and the switch $s2_3$ will complete the circuit through the starter coil of timer $T_1$. This moves all the switches in timer $T_1$ to the upper position and starts the timer motor moving switches $s1_1$ and $s2_1$ to the position shown and starting the timing cycle. At the same time the switches in timer $T_2$ are reset to the upper position by the energizing of the starter coil through terminals $t4_1$, $t3_1$ and $t1_2$ before switch $s3_1$ opens. Timer $T_2$ is ready to run.

If it is desired to have a more positive control over the incoming material to which the colorant is to be added, a solenoid 59 can be provided to control a valve 60 in the supply pipe 30. The solenoid 59 can be connected to the terminal block 54 and to the terminal $t8_1$, and be energized so as to open the valve 60 only during the time the colorant is being fed under the control of the timer $T_1$.

There has thus been provided an apparatus in which a raw material and a colorant therefor can be mixed thoroughly and easily, yet the control of the amount of colorant added can be precisely controlled. The control over the rotation of the feed drum 34 with the pockets therein enables the amount of colorant fed to the chamber 10 to be controlled exactly in multiples of the amount of colorant held by each pocket in the feed drum. Colors of successive batches of material, for example plastic, can therefore be matched precisely. The control system enables the apparatus to be operated continuously so as to mix batch after batch, each being exactly the same as the preceding batch or batches. The apparatus is easily adaptable for use with various types of feeding and supply systems, and will deliver batches to various types of molding or other processing machines.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

What is claimed is:

1. An apparatus for blending bulk raw materials, comprising a blending chamber, at least one door on the bottom of said chamber and door control means coupled with said door for opening and closing said door, a vertical tube within said blending chamber, a screw conveyor within said vertical tube and extending out of the bottom of said tube and having an outside diameter substantially equal to the inside diameter of said tube, the bottom of said tube being spaced from the bottom of said chamber, conveyer driving means connected to said conveyor, a cover on said chamber, a raw material feed means extending through said cover for feeding raw material into the chamber, and additive material feed means on said cover and comprising a feed drum having a plurality of separate pockets therein, a metering screw having one end adjacent said feed drum for feeding additive to said feed drum, and a feed screw adjacent the other end of said metering screw for feeding additive to said metering screw, housings around said feed drum and metering screw, and a feed hopper in which said feed screw is positioned, the housing for said feed drum opening into said chamber and said hopper opening into said housings, and feed drive means driving said drum and screws.

2. An apparatus as claimed in claim 1 in which said housings comprise a feed drum housing within which said feed drum is closely fitted and rotatably mounted, said feed drum housing having openings therein which are spaced from each other around the housing a distance greater than the spacing of said pockets, said chamber cover having an opening therein with which one of the openings in said feed drum housing is aligned, a metering screw housing having an opening at one end aligned with the other opening in said feed drum housing and having an opening at the other end and within which said metering screw is closely fitted, said hopper opening into said opening at the other end of said metering screw housing.

3. An apparatus as claimed in claim 1 in which said door control means comprises a solenoid, and said feed drive means comprise a plurality of electric motors one for the feed drum and one for each screw, and timer means coupled with said solenoid and said feed drive motors for driving said motors for a predetermined length of time for feeding the additive material, then stopping said feed drive motors while allowing said conveyor driving means to continue to operate, and after a predetermined blending time, actuating said solenoid to open said door and discharge the blended materials.

4. An apparatus as claimed in claim 3 in which said timer means comprises a plurality of timers adapted to be set at predetermined times, said timers being interconnected to operate in sequence and to repeat the sequential operation when the discharge of materials from the apparatus is complete.

5. An apparatus as claimed in claim 4 in which there are three timers, one for timing the feeding of the additive material, a second for timing the blending of the additive and the other material, and a third for timing the discharge, said timers being interconnected with each other and with the feed motors and the solenoid to operate in order, and being interconnected to start the operation of the first timer and the feed motors when the third timer runs out.

References Cited by the Examiner
UNITED STATES PATENTS

| | | | |
|---|---|---|---|
| 2,517,456 | 8/1950 | Wherrett | 259—97 |
| 3,076,637 | 2/1963 | Moziel et al. | 259—8 |

WALTER A. SCHEEL, *Primary Examiner.*

CHARLES A. WILLMUTH, *Examiner.*